J. H. LYNN.
ANTISLIPPING TIRE.
APPLICATION FILED MAY 4, 1916.
1,213,663.
Patented Jan. 23, 1917.
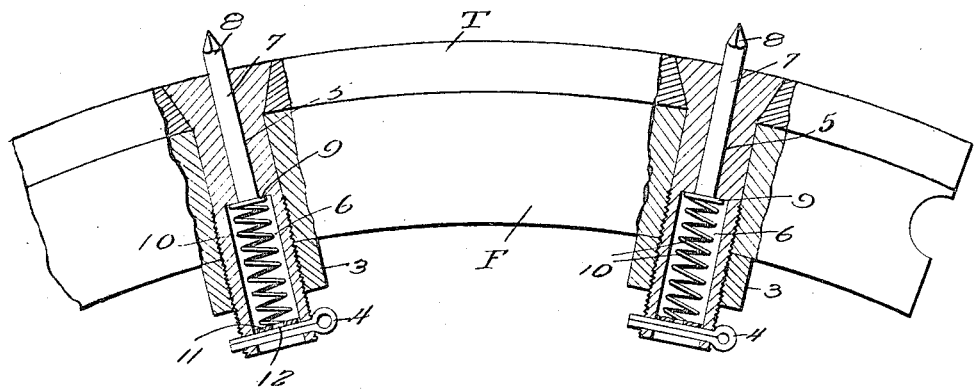
FIG.1.  FIG.3.
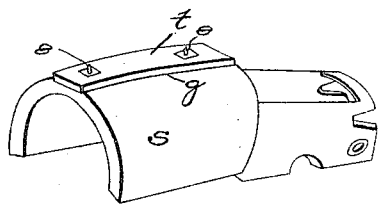
FIG.2.
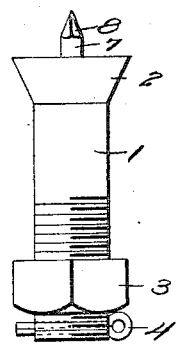
Inventor
John H Lynn;
By Mason Fenwick Lawrence,
Attorneys

UNITED STATES PATENT OFFICE.

JOHN H. LYNN, OF COPLAY, PENNSYLVANIA.

ANTISLIPPING TIRE.

1,213,663. Specification of Letters Patent. Patented Jan. 23, 1917.

Application filed May 4, 1916. Serial No. 95,415.

*To all whom it may concern:*

Be it known that I, JOHN H. LYNN, a citizen of the United States, residing at Coplay, in the county of Lehigh and State of Pennsylvania, have invented certain new and useful Improvements in Antislipping Tires; and I do hereby declare the following to be a full, clear, and exact description of the invention, such as will enable others skilled in the art to which it appertains to make and use the same.

This invention relates to tires, and more especially to anti-slipping devices therefor; and the object of the same is to produce such a device for application to a tire of the ordinary construction or to a cushion or sectional tire, which device has features of self-preservation as will be explained in the following specification.

Reference is made to the accompanying drawings wherein—

Figure 1 is a side elevation of a tire and felly partly in longitudinal section and supplied with this improved anti-slipping device, Fig. 2 is a side elevation of the device alone, and Fig. 3 is a perspective detail of one member of a sectional tire with the anti-slipping device applied and serving also to fasten the tread to the body of the section.

The sectional tire illustrated in Fig. 3 forms the subject-matter of a companion application filed by me on March 8th, 1916, and bearing Serial Number 82,965, and no claim for the details of the tire itself is made in the present application.

Coming now to the anti-slipping device, the same is shown herein as including a bolt having a body 1, a head 2 at its outer end larger than the body and preferably flaring outward, and which head may be of any suitable configuration, possibly square, a nut 3 on the threaded inner end of the bolt, and a nut-lock consisting of a split pin 4 passing through the inner end of the bolt beyond the nut so that the latter may not become lost. The bolt has a hollow body, or rather its outer end is provided with a bore 5 which is enlarged at its inner end into a chamber 6, the bore opening through the outer face of the head 2 and the chamber opening through the inner extremity of the body. Within the bore is mounted a spur 7 having its outer extremity pointed as at 8 and its inner extremity formed into a head 9 larger than the bore 5 but smaller than the chamber 6; and a spring 10 is mounted in said chamber to hold the head 9 normally against the shoulder between the chamber and bore as best seen in Fig. 1. This spring is herein illustrated as being helical, and its inner end rests on a washer 11 supported by the cotter pin 4, the washer preferably having a hole 12 to permit the outlet of water which might accumulate within the chamber 6.

In Fig. 1 this device is shown as passed through two elements and connecting them, the outer element being a tire or tread T and the inner element in this case a felly F, with the outer end of the head 2 flush with the face of the tire and the inner end of the bolt extending beyond the inner face of the felly so that the nut can screw up against the latter. In Fig. 3 this device is shown as holding an outer element or tread on an arched tire, here of the sectional type. In this case the tread $t$ is mounted within a groove $g$ in the section $s$, and the bolt serves to hold the tread to the section. The latter might be of soft metal but the tread should be of hard metal so as to provide an armor for the section. In either case the head flares outward as shown, and therefore may be worn down almost or quite to the body 1 before it will allow the outer tire-element T or $t$ to become loose on the inner element F or $s$ and possibly to slip off the bolt entirely. As the head wears, the spur wears, and if the wear is unequal no harm results.

When the parts are assembled as shown in the drawings, the tip of the spur projects beyond the outer face of the head and embeds the ordinary roadway so as to prevent the tread or tire from slipping thereon. The strength of the spring will be such that the point 8 will to an extent embed the roadway or pavement, even though the latter have considerable density. Yet the spring will yield at times to permit the spur to be pushed upward so that the point 8 is entirely housed within the bore. For instance, should a wheel having this device pass over a railroad track or should one of the spurs strike an extremely hard part of the roadway, or a stone, where the point cannot enter the roadway at all, the spring 10 will yield as clearly understood. The ideal arrangement is to put such tension on the spring 10 that the spur may be pressed inward to some extent whenever it contacts with the surface, excepting possibly where the latter is sandy or extremely soft. Hence the spur is constantly moving within the bore 5, and for this reason it is self-cleaning, and what grit, sand or water may get into the bore 5, passes into the chamber 6, and thence through the hole 12 in the washer 11 as the device passes over the top of the wheel at each revolution—thus preserving the parts in a condition where they are unclogged and therefore always operative. The bolt serves the additional function of holding the tire on the felly or the tread on the section, and this constitutes one feature of my invention.

What I claim is:

1. An anti-slipping device for tires comprising a bolt having a bore which opens through its outer end and enlarged into a chamber which opens through its inner end, a spur slidably mounted in said bore and having a point projecting beyond the outer end of the bolt and a head at its inner end standing within said chamber, a pin across the inner end of the latter, a washer resting on the pin and having a hole in it, and an expansive coiled spring between said washer and bolt-head, for the purpose set forth.

2. The combination with a tire, and a tread overlying the same, these parts being pierced with registering apertures; of a bolt having a flaring head fitting the aperture of the tread and a body projecting through the tire and threaded for the reception of a nut, said bolt having a bore through its outer portion and an enlarged chamber through its inner portion communicating with the bore, a spur within the latter having a point projecting beyond the outer end of the bolt and a head standing within said chamber, a pin across the inner end of the chamber, and an expansive spring within such chamber between the pin and head, for the purpose set forth.

In testimony whereof I affix my signature.

JOHN H. LYNN.

Copies of this patent may be obtained for five cents each, by addressing the "Commissioner of Patents, Washington, D. C."